Dec. 9, 1930.   R. S. WALLENBERG   1,784,259
BATTERY TERMINAL CONNECTER
Filed May 3, 1928
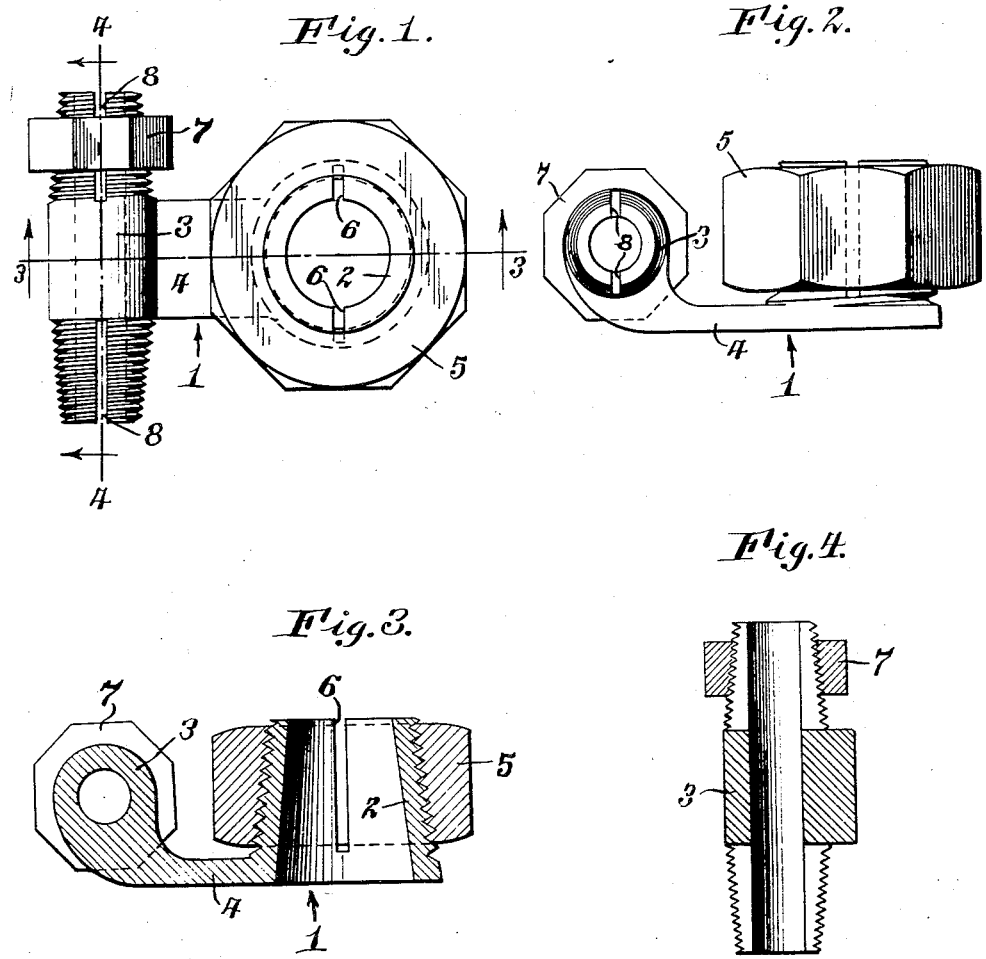
Inventor
Richard S. Wallenberg
By Popp and Powers
Attorney Patented Dec. 9, 1930

1,784,259

UNITED STATES PATENT OFFICE

RICHARD S. WALLENBERG, OF BUFFALO, NEW YORK, ASSIGNOR OF ONE-HALF TO ROBERT E. DONOVAN, OF TONAWANDA, NEW YORK

BATTERY-TERMINAL CONNECTER

Application filed May 3, 1928. Serial No. 274,793.

This invention relates to improvements in electrical connecters of the kind particularly intended for use in connection with storage batteries wherein they function to connect the battery terminal with a lead wire or other conductor.

An object of the invention is to provide a connecter which can be quickly connected to, or disconnected from, either or both the battery terminal and lead wire and which, when connected, will provide a firm, tight and full connection that is not readily loosened by the vibrations or other jars and shocks to which the connecter may be subjected.

A further object is to provide a sturdy and compact construction which can be manufactured with facility and low cost.

An embodiment of the invention is illustrated in the accompanying drawings, wherein:

Figure 1 is a top plan view of the unit.
Figure 2 is a side elevation of the same.
Figure 3 is a section through line 3—3 of Figure 1.
Figure 4 is a section along line 4—4 of Figure 2.

The improved connecter includes a member formed to fit over the battery terminal and also to receive a lead wire, together with means cooperating with said member for clamping or locking it to both the terminal and the lead wire.

The member is indicated generally at 1 and as shown, comprises an upright tubular lug 2 and a horizontal tubular lug 3, these lugs being secured to opposite ends of a connecting portion or neck 4 or being integral therewith. The lug 2 is adapted to receive the battery terminal and the lug 3 to receive the lead wire.

The lug 2 is tapered both internally and externally from the neck 4 outwardly, the internal taper being provided so that the lug will fit snugly upon the battery terminal. The external face of the lug is also threaded to receive a nut 5, which is both internally tapered and threaded. It will thus be seen that when the lug 2 is fitted over the battery terminal and the nut 5 threaded tightly upon the lug, the nut will tend to squeeze the lug on the terminal. In order to lock the lug on the battery terminal and thus ensure a good stable connection, the lug is formed with a slot 6 which permits it to spring tightly against the terminal under the pressure of the nut.

The horizontal tubular lug 3 is preferably of uniform internal diameter but externally tapered from the center toward both ends. The opposite ends of this lug are externally threaded to receive internally threaded and tapered nuts 7 one of which is shown. This lug is also provided with a slot 8 at each end so that it can be locked securely against the lead wire when the latter is thrust into the lug and the nuts 7 threaded tightly thereon. While it is only necessary to have one end of the lug 3 formed to clamp the cable conductor, the provision of both ends so formed is preferred. This has the advantage that the lead wire may be secured in the end of the lug which is most convenient, it being understood that in some installations it will be desirable because of adjacent parts of the battery hanger or adjacent parts of the automobile body, that the lead wire be inserted in the end of the lug which is the most accessible. The normally unused end of the lug may also be available for connecting various accessories to the battery as well as being available for the lead wire should the other end of the lug become unfit for use.

It is readily apparent that a connecter of this type can be manufactured very easily inasmuch as that part of the member composed of the lugs and connecting portion can be cast into a form which requires but one finishing operation, namely forming the external threads and the entire manufacture completed by making the three nuts as shown.

Having described my invention, I claim:

A battery terminal connecter comprising as an integral unit a pair of tubular clamping members disposed at right angles to each other, one of said members having a continuous lower end and a split upper end, the said upper end being tapered and externally threaded for cooperation with a nut to spring the walls of the split upper end against a terminal post of a battery, the other said member having oppositely extending split ends and a continuous central portion, each of said split ends being tapered and externally threaded for cooperation with a nut to spring the walls of said split portions against a lead wire to said battery.

In testimony whereof I hereby affix my signature.

RICHARD S. WALLENBERG.